United States Patent [19]

Ando et al.

[11] Patent Number: 4,537,954
[45] Date of Patent: Aug. 27, 1985

[54] PROCESS FOR THE PREPARATION OF POLYMER COMPOSITIONS HAVING LOW VOLATILE CONTENT

[75] Inventors: Toshihiko Ando; Norifumi Ito; Tetsuyuki Matsubara, all of Yokohama; Kozo Ichikawa, Hatano; Susumu Fukawa, Hiratsuka; Tetsuo Maeda, Urayasu, all of Japan

[73] Assignees: Mitsui Toatsu Chemicals, Inc.; Toyo Engineering Corporation, both of Tokyo, Japan

[21] Appl. No.: 587,592

[22] Filed: Mar. 8, 1984

[30] Foreign Application Priority Data

Mar. 14, 1983 [JP] Japan .................................. 58-41796

[51] Int. Cl.$^3$ .......................... C08F 6/00; C08G 6/00; C08J 3/00
[52] U.S. Cl. .................................... 528/481; 528/496; 528/499; 528/501
[58] Field of Search ................. 528/501, 481, 496, 499

[56] References Cited

U.S. PATENT DOCUMENTS 4,294,652 10/1981 Newman ......................... 528/501 X
4,439,601 3/1984 McCurdy et al. .............. 528/501 X

FOREIGN PATENT DOCUMENTS 51-134781 11/1976 Japan .
1370589 10/1974 United Kingdom ................ 528/501

Primary Examiner—Joseph L. Schofer
Assistant Examiner—S. Babajko
Attorney, Agent, or Firm—Fisher, Christen & Sabol

[57] ABSTRACT

A continuous process for the preparation of polymer compositions having low volatile content which comprises passing a styrene polymer-containing polymerization fluid composition obtained by solution polymerization or bulk polymerization through a volatile component separator comprising vertical foaming preheaters and vacuum vessels directly connected therewith and thereby removing volatile components continuously from the polymerization fluid composition in three stages to obtain a polymer composition having low volatile content, the process being characterized in that each of three stages includes at least one vertical foaming preheater and one vacuum vessel, the first stage is carried out under such pressure and temperature conditions that the polymerization fluid composition leaving this stage contains said styrene polymer in an amount of 60 to 80% by weight and the temperature of the polymerization fluid composition passing through this stage lies between 70° and 120° C., the second stage is carried out under such pressure and temperature conditions that the molten polymer composition leaving this stage has a volatile content of not greater than 1% by weight and can retain good fluidity, and the third stage is carried out in such a way that devolatilization is effected at a pressure of 50 Torr or less in the presence of a highly volatile foaming agent.

9 Claims, 1 Drawing Figure

PROCESS FOR THE PREPARATION OF POLYMER COMPOSITIONS HAVING LOW VOLATILE CONTENT

BACKGROUND OF THE INVENTION

1. Field of the Invention

This invention relates to improvements in a process for the preparation of polymer compositions having low volatile content by the continuous removal of volatile components, such as unreacted monomers, solvents, chain transfer agents and low-molecular-weight polymers, from a polymerization fluid composition containing a styrene polymer.

2. Description of the Prior Art

In the prior art relating to the continuous removal of volatile components from a polymerization fluid composition, there are a number of well-known methods which involve using a multitubular heat exchanger to preheat, with or without foaming, a polymerization fluid composition containing volatile components and then flashing it into a vacuum vessel (see, for example, Japanese Patent Publication Nos. 31678/'70 and 29797/'73 as well as Japanese Patent Laid-Open No. 134781/'76).

In these prior art methods, the effective means for reducing the volatile content of the resulting polymer composition as much as possible are to heat the polymerization fluid composition containing volatile components to higher temperatures by means of the preheater and to enhance the degree of vacuum of the vacuum vessel. However, as the temperature of the polymerization fluid composition is raised, especially the residual monomer or monomers polymerize in the preheater and, hence, the content of low-molecular-weight polymers in the resulting polymer composition increases. Thus, excessively high temperatures of the preheated polymerization fluid composition have the disadvantages of reducing the thermal resistance of molded articles, causing oily matter to adhere to the mold during molding operation, and bringing about an unfavorable color change and, in some cases, an impairment of transparency depending on the heat history of the polymer composition. On the other hand, enhancement of the degree of vacuum of the vacuum vessel causes a marked increase in the gaseous volume flow rate of volatile components, resulting in an increased pressure loss within the piping and condenser. Such equipment requires immense construction costs. Moreover, where the amount of volatile components to be separated by evaporation is large, it is practically impossible to construct equipment exceeding a certain degree of vacuum.

Thus, the above-described means have their limits, so that it has been extremely difficult to reduce the content of the volatile components (such as unreacted monomers, solvents, chain transfer agents and low-molecular-weight polymers) remaining in the polymer composition to a sufficiently low level. For this reason, the additional use of a vented extruder, a thin-film evaporator or the like has been proposed for the purpose of reducing the volatile components remaining in the product polymer to the fullest extent. However, these methods cause an increase in equipment and power costs, resulting in increased production costs. Thus, it is highly desirable to overcome the above-described disadvantages.

SUMMARY OF THE INVENTION

It is an object of the present invention to provide a process for the preparation of polymer compositions having low volatile content which can improve the devolatilizing capacity of a volatile component separator to a marked degree, and which thereby enables volatile components to be continuously removed from a polymerization fluid composition with high efficiency.

It is another object of the present invention to provide a process for the preparation of polymer compositions having low volatile content which does not impair the quality of the resulting product.

It is still another object of the present invention to provide a process for the preparation of polymer compositions having low volatile content which is advantageous from point of view of economy.

These and other objects of the present invention are accomplished by a continuous process for the preparation of polymer compositions having low volatile content which comprises passing a styrene polymer-containing polymerization fluid composition obtained by solution polymerization or bulk polymerization through a volatile component separator comprising vertical foaming preheaters and vacuum vessels directly connected therewith and thereby removing volatile components continuously from the polymerization fluid composition in three stages to obtain a polymer composition having low volatile content, the process being characterized in that each of the three stages includes at least one vertical foaming preheater and one vacuum vessel, the first stage is carried out under such pressure and temperature conditions that the polymerization fluid composition leaving this stage contains said styrene polymer in an amount of 60 to 80% by weight and the temperature of the polymerization fluid composition passing through this stage lies between 70° and 120° C., the second stage is carried out under such pressure and temperature conditions that the molten polymer composition leaving this stage has a volatile content of not greater than 1% by weight and can retain good fluidity, and the third stage is carried out in such a way that devolatilization is effected at a pressure of 50 Torr or less in the presence of a highly volatile foaming agent.

DETAILED DESCRIPTION OF THE PREFERRED EMBODIMENTS

Figure 1:
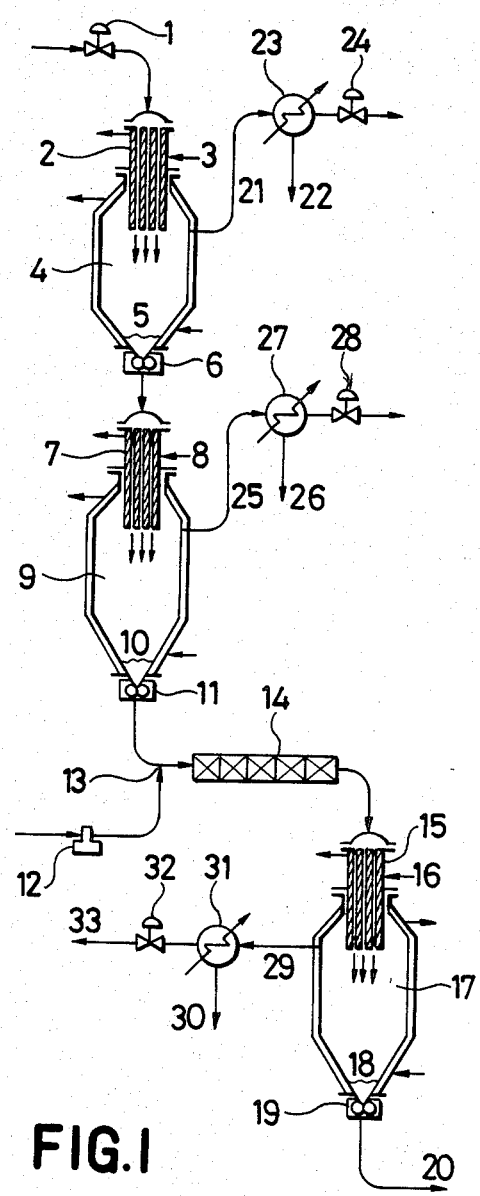
FIG. 1 is a flow sheet illustrating one embodiment of the continuous process for the preparation of polymer compositions having low volatile content in accordance with the present invention.

In accordance with the present invention, it is very effective for the continuous removal of volatile components from a styrene polymer to use a volatile component separator comprising vertical foaming preheaters and vacuum vessels directly connected therewith and thereby to carry out its devolatilization in three stages so that each stage includes at least one vertical foaming preheater and one vacuum vessel. More specifically, at the first stage, a styrene polymer-containing polymerization fluid composition obtained by solution polymerization or bulk polymerization is devolatilized under such pressure and temperature conditions that the polymerization fluid composition withdrawn from the bottom of the vacuum vessel of this stage has a temperature of 70° to 120° C. and a styrene polymer content of 60 to 80% by weight. At the second stage, the polymerization fluid composition derived from the first stage is devolatilized under such pressure and temperature conditions that the molten polymer composition withdrawn from the bottom of the vacuum vessel of this stage has a volatile content of not greater than 1% by weight and can retain good fluidity. At the third stage, the molten polymer composition obtained from the second stage is mixed with a highly volatile foaming agent and then devolatilized at a pressure of 50 Torr or less to complete the removal of volatile components from the polymerization fluid composition.

The styrene polymers which can be used in the process of the present invention include (1) polymers consisting of at least one styrene monomer selected from styrene, alkylstyrenes (e.g., methylstyrene, ethylstyrene, isopropylstyrene and the like), halogenated styrenes (e.g., chlorostyrene, bromostyrene and the like) and halogenated alkylstyrenes; (2) copolymers consisting of at least one styrene monomer as described above and at least one acrylic monomer selected from acrylonitrile, methacrylonitrile, methyl acrylate, ethyl methacrylate and the like; (3) copolymers consisting of (a) at least one styrene mcnomer as described above or a combination of at least one styrene monomer as described above and at least one acrylic monomer as described above and (b) at least one rubber or rubber-like polymer selected from polybutadiene, copolymer rubbers of butadiene with styrene, acrylonitrile and/or methyl methacrylate, natural rubber, polychloroprene, ethylene-propylene copolymer rubber, ethylene-propylene-diene copolymer rubber and the like.

The polymerization may be carried out according to any of the well-known solution polymerization and bulk polymerization techniques. Solvents suitable for use in solution polymerization include, for example, benzene; alkylbenzenes such as toluene, ethylbenzene, xylene and the like; ketones such as acetone, methyl ethyl ketone and the like; aliphatic hydrocarbons such as hexane, octane and the like. Chain transfer agents suitable for use as molecular weight modifiers include aliphatic and aromatic mercaptans, pentaphenylethane, α-methylstyrene dimer and the like.

In the process of the present invention, the first stage is carried out under such pressure and temperature conditions that the polymerization fluid composition at the bottom of the vacuum vessel of this stage has a polymer content of 60 to 80% by weight and the temperature of the polymerization fluid composition lies between 70° and 120° C. More specifically, the polymerization fluid composition passing through the preheater is preferably kept at a temperature of 70° to 120° C. and more preferably 80° to 110° C. While foaming, the polymerization fluid composition flows downward under the influence of gravity and a pressure gradient and enters the vacuum vessel kept at a pressure of 80 to 300 Torr, where the volatile components present in the polymerization fluid composition are partially removed to obtain a polymerization fluid composition having the above-described temperature and makeup. The polymerization fluid composition within the vacuum vessel is preferably in the range of 80° to 110° C.

At the second stage, the polymerization fluid composition withdrawn from the bottom of the vacuum vessel of the first stage is treated under such temperature and pressure conditions that its volatile content is reduced to not greater than 1% by weight, preferably 0.3 to 1.0% by weight, and the resulting molten polymer composition can retain good fluidity. More specifically, the temperature of the preheated polymerization fluid composition is preferably in the range of 160° to 250° C. and more preferably 180° to 240° C., and the pressure within the vacuum vessel is preferably in the range of 30 to 100 Torr and more preferably 40 to 80 Torr.

At the third stage, a highly volatile foaming agent (i.e., a foaming agent having at least the same degree of volatility as the volatile components remaining in the polymer composition) such as water, methanol, ethanol, isopropanol or the like is added to the molten polymer composition obtained from the second stage, and they are preferably mixed in a stationary mixer. Then, the molten polymer composition is passed through a preheater and then flashed into a vacuum vessel kept at a pressure of 50 Torr or less. The temperature of the molten polymer composition passing through the preheater preferably lies between 190° and 260° C. and more preferably 200° to 250° C. The molten polymer composition leaving the third stage usually has a volatile content of not greater than 0.15% by weight.

One preferred embodiment of the present invention will now be described with reference to the flow sheet shown in FIG. 1.

A styrene polymer-containing polymerization fluid composition continuously obtained from a solution polymerization or bulk polymerization process is fed from the polymerization zone by way of an inlet valve 1. At this point, the polymerization fluid composition has a temperature of 130° to 150° C. and usually contains the styrene polymer in an amount of 40 to 60% by weight. Inlet valve 1 has the function of keeping the pressure of the polymerization zone above the vapor pressure at the reaction temperature of the aforesaid polymerization fluid composition. Preferably, such parameters as the temperature and flow rate of the heat transfer medium are determined so that the pressure at the top of the first-stage vertical foaming preheater 2 will be lower than the vapor pressure at the reaction temperature of the polymerization fluid composition fed thereto. Under such conditions, the styrene polymer-containing polymerization fluid composition is exposed to reduced pressure, so that the volatile components present therein evaporates and foams vigorously. At the same time, since the latent heat of vaporization is absorbed, the temperature of the polymerization fluid composition at the top is reduced and the formation of low-molecular-weight polymers is suppressed thereby. While being kept at a temperature of 70° to 120° C. and preferably 80° to 110° C., the foaming polymerization fluid composition flows downward through the heat exchange section of preheater 2 under the influence of gravity and a pressure gradient and then enters the first-stage vacuum vessel 4. In this case, the temperature of the heat transfer medium 3 used for the first-stage vertical foaming preheater 2 and the pressure within the first-stage vacuum vessel 4 are determined so that the polymerization fluid composition at the bottom of vacuum vessel 4 will have a styrene polymer content of 60 to 80% by weight and the temperature of the polymerization fluid composition lies between 70° and 120° C. Preferably, the polymerization fluid composition within the first-stage vacuum vessel 4 has a temperature of 80° to 110° C. and a pressure of 80 to 300 Torr. A portion of the volatile components present in the polymerization fluid composition, which foams while flowing downward through preheater 2 and being kept at a constant temperature, is gasified within vacuum vessel 4. The gasified volatile components are separated from the polymer, withdrawn from an upper section of vacuum vessel 4 through a line 21, condensed in a condenser 23 cooled with a coolant, and recovered in the liquid state through a line 22, while the uncondensed gas is transferred to a subsequent step by way of a control valve 24. At the same time, the polymerization fluid composition 5 with reduced volatile components and having a styrene polymer content of 60 to 80% by weight is withdrawn from the bottom of vacuum vessel 4 by means of a discharge gear pump 6 and transferred to the second-stage vertical foaming preheater 7.

At the second stage, the greater part of the volatile components present in the polymerization fluid composition fed thereto is gasified within the second-stage vacuum vessel 9. The temperature and flow rate of heat transfer medium 8 are controlled so that, even if the content of the volatile components remaining in the molten polymer composition is reduced to 1% by weight or less, the fluidity of the molten polymer composition will not be impaired. In this case, it is desirable to use a heat transfer medium having the lowest possible temperature that is preferably 260° C. or below. Preferably, the temperature of the polymerization fluid composition passing through the second-stage vertical foaming preheater 7 lies between 160° and 250° C., more preferably between 180° and 240° C. The pressure within the second-stage vacuum vessel 9 is determined so that the content of the volatile components remaining in the molten polymer composition at that temperature will be in the range of 0.3 to 1.0% by weight, and it preferably ranges from 30 to 100 Torr, and more preferably from 40 to 80 Torr. These volatile components gasified within the second-stage vacuum vessel 9 are withdrawn from an upper portion of vacuum vessel 9 through a line 25, condensed in a condenser 27 cooled with a coolant, and recovered in the liquid state through a line 26, while the uncondensed gas is transferred to a subsequent step by way of a control valve 28. At the same time, the molten polymer composition 10 is withdrawn from the bottom of vacuum vessel 9 by means of a discharge gear pump 11 and transferred to the third-stage vertical foaming preheater 15.

To the molten polymer composition withdrawn from the second-stage vacuum vessel 9 by means of discharge gear pump 11 is added a foaming agent through a feed port 13 for the purpose of causing the molten polymer composition to foam within the third-stage vacuum vessel 17. Using a mixer 14, the foaming agent is mixed with and finely dispersed in the molten polymer composition. Then, the molten polymer composition is allowed to flow downward through the third-stage vertical foaming preheater 15 whose jacket is provided with a heat transfer medium 16 having the lowest possible temperature that does not impair the fluidity of the molten polymer composition. Thus, the molten polymer composition is heated, preferably to a temperature of 190° to 260° C., and more preferably 200° to 250° C., and then flashed into the third-stage vacuum vessel 17 having a pressure of 50 Torr or less.

The term "foaming agent" as used herein means any substance that has at least the same degree of volatility as the volatile components remaining in the molten polymer composition, and specific examples thereof include water, methanol, ethanol, isopropanol and the like. It is preferable to use a foaming agent having poor mutual solubility with the molten polymer composition. The foaming agent is used in an amount of 2 to 30 moles, preferably 5 to 20 moles, per mole of the volatile components remaining in the molten polymer composition.

The mixer used at this stage preferably comprises a stationary mixer. The term "stationary mixer" as used herein means any mixer having no moving parts, and specific examples thereof include the mixers that are described in Chemical Equipment, 21(3), 20 (1979) and are commercially available under the trade names of Static Mixer (Kenics Corp.), Static Mixing Element (Sulzer Brothers Co.), Ross ISG Mixer, LPD Mixer (Toray Co.) and the like.

Usually, a plurality of such mixers are connected in series and disposed in the flow path of the molten polymer composition. As a result of the addition of the foaming agent, the molten polymer composition fed to the third-stage vertical foaming preheater 15 by means of gear pump 11 foams vigorously within the third-stage vacuum vessel 17 and undergoes an accelerated renewal of surfaces. Thus, the residual volatile components which failed to evaporate up to the above-described second stage are gasified together with the foaming agent. The gasified foaming agent and volatile components are withdrawn from an upper section of vacuum vessel 17 through a line 29, partially condensed in a condenser 31, and recovered through a line 30, while the uncondensed gas 33 is transferred to a subsequent step by way of a control valve 32. The molten polymer composition 18 which has had a further reduction of volatile components is continuously withdrawn through a line 20 by means of a gear pump 19 and made into a desired product form.

Thus, the process of the present invention makes it possible to reduce the content of the volatile components (such as unreacted monomers, solvents, chain transfer agents and low-molecular-weight polymers) present in a styrene polymer to such a low level as has never been attainable with the prior art. The styrene polymer thus obtained shows an improvement in thermal resistance and produces only a small amount of oily matter during molding operation. Moreover, where no rubber or rubber-like polymer is used, the resulting styrene polymer also presents an excellent appearance from the viewpoint of color and transparency.

The present invention is further illustrated by the following examples and comparative examples. The experimental equipment used in these examples was constructed in the manner shown in FIG. 1.

EXAMPLE 1

A polymerization fluid composition consisting of 50% by weight of polystyrene (having a number-average molecular weight of 160,000 and containing 1.2% by weight of methanol-soluble matter) and 10% by weight of ethylbenzene with the balance being unreacted styrene was prepared by thermal polymerization at 135° C.

This polymerization fluid composition, which had a temperature of 135° C. and a pressure of 4.0 kg/cm$^2$, was continuously fed at a flow rate of 6.3 kg/hr to the equipment of FIG. 1 by way of inlet valve 1. The pressure at the top of the first-stage vertical foaming preheater 2 was reduced to 0.5 kg/cm$^2$, so that the polymerization fluid composition foamed and its temperature at this point was 120° C. The temperature of the heat transfer medium circulating through the jacket was 110° C. and the temperature of the foaming polymerization fluid composition heated and flashed into vacuum vessel 4 was 102° C. The pressure within vacuum vessel 4 was kept at 170 Torr and its temperature was held constant by circulating a heat transfer medium having a temperature of 125° C. through its jacket. The polymerization fluid composition 5 at the bottom of vacuum vessel 4 had a polystyrene content of 68% by weight.

This polymerization fluid composition 5 was transferred to the second-stage vertical foaming preheater 7 by means of gear pump 6. The temperature of the heat transfer medium 8 circulating through the jacket of preheater 7 was 250° C. and the temperature of the foaming polymerization fluid composition heated and flashed into vacuum vessel 9 was 225° C. The pressure within vacuum vessel 9 was kept at 50 Torr. Thus, a molten polymer composition 10 having a volatile content of 0.8% by weight was obtained at the bottom of vacuum vessel 9. This molten polymer composition 10 was transferred to the third-stage vertical foaming preheater 15 by means of gear pump 11.

To the molten polymer composition was added 0.06 kg/hr of water at ambient temperature through feed port 13. The line and the jacket of stationary mixer 14 were kept at a temperature of 235° C. The molten polymer composition was fed to the third stage vertical foaming preheater 15 whose temperature was held constant by circulating a heat transfer medium 16 having a temperature of 260° C. Thus, the molten polymer composition was allowed to foam in vertical foaming preheater 15 and then flashed into vacuum vessel 17. The temperature of the foaming molten polymer composition was 220° C. and the pressure within vacuum vessel 17 was kept at 30 Torr. The molten polymer composition 18 at the bottom of vacuum vessel 17 was withdrawn by means of gear pump 19 at a rate of 3.3 kg/hr and made into a desired product form.

The analytical values of the product polystyrene thus obtained are shown in Table 1.

Using an injection molding machine, the above polystyrene was continuously molded for 2 hours. Then, the mold was examined for the presence of oily matter adhering thereto. As a result, the amount of oily matter adhering to the mold was found to be satisfactorily small.

COMPARATIVE EXAMPLE 1

The same polymerization fluid composition as used in Example 1 was devolatilized under the following conditions: The temperature of the heat transfer medium 3 used for the first-stage vertical foaming preheater 2 was 270° C., the temperature of the foaming molten polymer composition was 230° C., and the pressure within vacuum vessel 4 was kept at 30 Torr. After completion of the first stage, the resulting polymerization fluid composition was withdrawn from vacuum vessel 4 by means of gear pump 6 and directly made into a desired product form, instead of being transferred to the second and third stages.

The results thus obtained are shown in Table 1.

As can be seen from this table, the content of the residual volatile components was higher than that observed in Example 1. Moreover, a significant reduction in molecular weight and a high content of methanol-soluble matter were noted. During molding operation, a very large amount of oily matter was found to adhere to the mold.

COMPARATIVE EXAMPLE 2

Devolatilization was carried out under the same conditions as described in Comparative Example 1, except that the temperature of heat transfer medium 3 was 240° C. and the pressure within vacuum vessel 4 was 30 Torr.

The results thus obtained are shown in Table 1.

As can be seen from this table, the reduction in molecular weight was similar to that observed in Example 1, but the contents of the residual volatile components and of methanol-soluble matter were significantly higher. During molding operation, a very large amount of oily matter was found to adhere to the mold.

TABLE 1

| | Molecular weight[*1] ($\times 10^{-4}$) | Residual monomer and solvent (ppm)[*2] | | | Methanol-soluble matter[*3] (wt. %) | Vicat softening point[*4] (°C.) | Adhesion of oily matter to mold[*5] |
|---|---|---|---|---|---|---|---|
| | | Styrene | Ethylbenzene | Total | | | |
| Example 1 | 14.2 | 401 | 25 | 426 | 0.73 | 107.5 | small |
| Comparative Example 1 | 12.8 | 841 | 51 | 892 | 1.49 | 105.0 | very large |
| Comparative Example 2 | 13.5 | 2,376 | 135 | 2,511 | 1.27 | 103.5 | very large |

[*1]Number-average molecular weight as measured by GPC analysis.
[*2]Analyzed by gas chromatography.
[*3]Determined by the reprecipitation method.
[*4]Measured according to ASTM D-1525.
[*5]After the product was continuously molded for 2 hours with a flat spiral-flow mold.

EXAMPLE 2

A polymerization fluid composition consisting of 51.5% by weight of an acrylonitrile-styrene copolymer (having a reduced viscosity of 0.78, containing 1.5% by weight of methanol-soluble matter, and consisting of acrylonitrile and styrene in a weight ratio of 1:3; hereinafter referred to as the AS resin) and 10% by weight of ethylbenzene with the balance being unreacted monomers was prepared by thermal polymerization at 142° C.

This polymerization fluid composition, which had a temperature of 142° C. and a pressure of 4.2 kg/cm², was continuously fed at a flow rate of 6.5 kg/hr to the equipment of FIG. 1 by way of inlet valve 1. Thereafter, the polymerization fluid composition was devolatilized in the same manner as described in Example 1, except that the temperature of the heat transfer medium 3 used for the first-stage vertical foaming preheater 2 was 120° C., the pressure within the first-stage vaouum vessel 4 was 180 Torr, the temperature of the heat transfer medium 8 used for the second-stage vertical foaming preheater 7 was 250° C., the pressure within the second-stage vacuum vessel 9 was 70 Torr, 0.11 kg/hr of methanol was added as the foaming agent through feed port 13, the pressure within the third-stage vacuum vessel 17 was 30 Torr, and the temperature of the heat transfer medium 16 used for the third-stage vertical foaming preheater 15 was 270° C.

The temperature of the polymerization fluid composition flashed into vacuum vessel 4 was 105° C. and the AS resin content at the bottom of vacuum vessel 4 was 70% by weight. The temperature of the polymerization fluid composition flashed into vacuum vessel 9 was 225° C. and the volatile content of the molten polymer composition 10 at the bottom of vacuum vessel 9 was 0.8% by weight. The temperature of the foaming molten polymer composition flashed into vacuum vessel 17 was 220° C.

The analytical values of the product thus obtained are shown in Table 2.

When this AS resin was continuously molded in the same manner as described in Example 1, the amount of oily matter adhering to the mold was found to be acceptably small. Moreover, the color and transparency of the molded articles were satisfactory.

COMPARATIVE EXAMPLE 3

The same polymerization fluid composition as used in Example 2 was devolatilized under the following conditions: The temperature of the heat transfer medium 3 used for the first-stage vertical foaming preheater 2 was 280° C. and the pressure within vacuum vessel 4 was kept at 30 Torr. After completion of the first stage, the resulting molten polymer composition was withdrawn from vacuum vessel 4 by means of gear pump 6 and directly made into a desired product form, instead of being transferred to the second and third stages.

The results thus obtained are shown in Table 2.

As can be seen from this table, the content of the residual volatile components were higher than that observed in Example 2. Moreover, a significant reduction in molecular weight and a high content of methanol-soluble matter were noted. During molding operation, a large amount of oily matter was found to adhere to the mold. In addition, the molded articles showed a very unfavorable color change and an great impairment of transparency as contrasted with those obtained in Example 2.

COMPARATIVE EXAMPLE 4

Devolatilization was carried out under the same conditions as described in Comparative Example 3, except that the temperature of heat transfer medium 3 was 250° C. and the pressure within vacuum vessel 4 was 20 Torr.

The results thus obtained are shown in Table 2.

As can be seen from this table, the reduction in molecular weight was similar to that observed in Example 2, but the contents of the residual volatile components and of methanol-soluble matter were significantly higher. During molding operation, a very large amount of oily matter was found to adhere to the mold. In addition, the molded articles showed an unfavorable color change and an great impairment of transparency.

COMPARATIVE EXAMPLE 5

In the procedure of Example 2, the molten polymer composition at the bottom of the second-stage vacuum vessel 9 was withdrawn by means of gear pump 11 and directly made into a product form, instead of being transferred to the third stage.

In this case, the first stage was carried out under the same conditions as described in Example 2. However, the temperature of the heat transfer medium 8 used for the second-stage vertical foaming preheater 7 was 270° C. and the pressure within the second-stage vacuum vessel 9 was 30 Torr.

The results thus obtained are shown in Table 2.

As can be seen from this table, the contents of the residual volatile components and of methanol-soluble matter were lower than those observed in Comparative Examples 3 and 4. However, the product of this comparative example did not compare with that of Example 2, especially in thermal resistance.

TABLE 2

| | Reduced[1] viscosity (dl/g) | Residual monomers and solvent (ppm) | | | | Methanol-soluble matter (wt. %) | Vicat softening point (°C.) | Color[2] | Transparency[3] | Adhesion of oily matter to mold |
| --- | --- | --- | --- | --- | --- | --- | --- | --- | --- | --- |
| | | Acrylonitrile | Styrene | Ethylbenzene | Total | | | | | |
| Example 2 | 0.76 | 6 | 367 | 42 | 415 | 1.20 | 110.5 | good | good | small |
| Comparative Example 3 | 0.74 | 82 | 1,210 | 145 | 1,437 | 2.52 | 107.5 | very unfavorable color change | greatly impaired | very large |
| Comparative Example 4 | 0.76 | 112 | 1,820 | 210 | 2,142 | 2.20 | 107.0 | unfavorable color change | greatly impaired | very large |
| Comparative Example 5 | 0.75 | 34 | 625 | 72 | 731 | 1.90 | 108.5 | unfavorable color change | impaired | large |

[1]Measured by a 0.5 g/dl solution of the copolymer in DMF at 30° C., using an Ubbelohde viscometer.
[2]Visual evaluation.
[3]Visual evaluation.

What is claimed is:

1. A continuous process for the preparation of polymer compositions having low volatile content which comprises passing a styrene polymer-containing polymerization fluid composition obtained by solution polymerization or bulk polymerization through a volatile component separator comprising vertical foaming preheaters and vacuum vessels directly connected therewith and thereby removing volatile components continuously from the polymerization fluid composition in three stages to obtain a polymer composition having low volatile content, the process being characterized in that each of the three stages includes at least one vertical foaming preheater and one vacuum vessel, the first stage is carried out under such pressure and temperature conditions that the polymerization fluid composition leaving this stage contains said styrene polymer in an amount of 60 to 80% by weight and the temperature of the polymerization fluid composition passing through this stage lies between 70° and 120° C., wherein the pressure within the vacuum vessel of said first stage is kept in the range of 80 to 300 Torr, the second stage is carried out in such a way that the molten polymer composition leaving this stage has a volatile content of 0.3 to 1% by weight, and can retain good fluidity, the temperature of the polymerization fluid composition heated in the preheater of this stage lies between 160° and 250° C., and the pressure within the vacuum vessel of this stage is kept in the range of 30 to 100 Torr, and the third stage is carried out in such a way that the temperature of the molten polymer composition heated in the preheater of this stage lies between 190° and 260° C. and devolatilization is effected at a pressure of 50 Torr or less in the presence of a highly volatile foaming agent.

2. A continuous process for the preparation of polymer compositions having low volatile content as claimed in claim 1 wherein said styrene polymer is (1) a polymer consisting of at least one styrene monomer selected from styrene, alkylstyrenes, halogenated styrenes and halogenated alkylstyrenes; (2) a copolymer consisting of at least one styrene monomer as described above and at least one acrylic monomer selected from acrylonitrile, methacrylonitrile, methyl acrylate and ethyl methacrylate; or (3) a copolymer consisting of (a) at least one styrene monomer as described above or a combination of at least one styrene monomer as described above and at least one acrylic monomer as described above and (b) at least one rubber or rubberlike polymer selected from polybutadiene, copolymer rubbers of butadiene with styrene, acrylonitrile and/or methyl methacrylate, natural rubber, polychloroprene, ethylene-propylene copolymer rubber and ethylenepropylenediene copolymer rubber.

3. A continuous process for the preparation of polymer compositions having low volatile content as claimed in claim 1 wherein said first stage is carried out under such pressure and temperature conditions that the polymerization fluid composition leaving this stage contains said styrene polymer in an amount of 60 to 80% by weight and the temperature of the polymerization fluid composition passing through this stage lies between 80° and 110° C.

4. A continuous process for the preparation of polymer compositions having low volatile content as claimed in claim 1 wherein said second stage is carried out in such a way that the temperature of the polymerization fluid composition heated in the preheater of this stage lies between 180° and 240° C. and the pressure within the vacuum vessel of this stage is kept in the range of 40 to 80 Torr.

5. A continuous process for the preparation of polymer compositions having low volatile content as claimed in claim 1 wherein said foaming agent is used in an amount of 2 to 30 moles per mole of the volatile components remaining in the molten polymer composition obtained from said second stage.

6. A continuous process for the preparation of polymer compositions having low volatile content as claimed in claim 5 wherein said foaming agent is used in an amount of 5 to 20 moles per mole of the volatile components remaining in the molten polymer composition obtained from said second stage.

7. A continuous process for the preparation of polymer compositions having low volatile content as claimed in claim 1 wherein the molten polymer composition obtained from said second stage is first mixed with said foaming agent and then fed to the preheater of said third stage.

8. A continuous process for the preparation of polymer compositions having low volatile content as claimed in claim 1 wherein said foaming agent comprises water, ethanol, methanol, or isopropanol.

9. A continuous process for the preparation of polymer compositions having low volatile content as claimed in claim 1 wherein said third stage is carried out in such a way that the temperature of the molten polymer composition heated in the preheater of this stage lies between 200° and 250° C.

* * * * *